US010277035B2

(12) United States Patent
Gudgel et al.

(10) Patent No.: US 10,277,035 B2
(45) Date of Patent: Apr. 30, 2019

(54) SYSTEM AND METHOD FOR CONTROLLING AND MONITORING SCALABLE MODULAR ELECTRIC DEVICES

(71) Applicant: MidNite Solar, Inc., Arlington, WA (US)

(72) Inventors: Robin Wayne Gudgel, Arlington, WA (US); Robert Dean Gudgel, Everett, WA (US); Justin A King, Arlington, WA (US)

(73) Assignee: Midnite Solar, Inc., Arlington, WA (US)

( * ) Notice: Subject to any disclaimer, the term of this patent is extended or adjusted under 35 U.S.C. 154(b) by 92 days.

(21) Appl. No.: 15/453,084

(22) Filed: Mar. 8, 2017

(65) Prior Publication Data

US 2018/0076663 A1 Mar. 15, 2018

Related U.S. Application Data

(60) Provisional application No. 62/394,071, filed on Sep. 13, 2016.

(51) Int. Cl.
*H02J 3/32* (2006.01)
*H02J 3/38* (2006.01)
(Continued)

(52) U.S. Cl.
CPC ............ *H02J 3/382* (2013.01); *H02J 3/32* (2013.01); *H02J 3/383* (2013.01); *H02J 3/386* (2013.01); *H02J 3/387* (2013.01); *H02J 7/007* (2013.01); *H02J 7/0068* (2013.01); *H02J 7/35* (2013.01); *H02J 13/0096* (2013.01); *H02M 7/003* (2013.01); *Y02B 90/222* (2013.01); *Y02E 10/563* (2013.01); *Y02E 10/566* (2013.01); *Y02E 10/763* (2013.01); *Y02E 40/72* (2013.01); *Y02E 70/30* (2013.01); *Y04S 10/12* (2013.01); *Y04S 10/123* (2013.01); *Y04S 20/12* (2013.01)

(58) Field of Classification Search
CPC ...... H02J 3/387; H02J 7/0068; H02J 13/0096; H02J 3/382; H02M 7/003
See application file for complete search history.

(56) References Cited

U.S. PATENT DOCUMENTS 6,153,947 A 11/2000 Rockow et al.
7,929,327 B2 * 4/2011 Haines .................. H02J 9/062
363/106

(Continued)

*Primary Examiner* — Jared Fureman
*Assistant Examiner* — Duc M Pham
(74) *Attorney, Agent, or Firm* — FisherBroyles LLP; Kevin D. Jablonski (57) ABSTRACT

Systems, apparatuses, and methods for a modular inverter system having a system controller module that includes several electronic switches that may be controlled to couple various nodes in the system controller module to various circuits coupled to input/output terminals at the modular inverter system to realize various modes of operation. Such modes of operation may include powering a local load (e.g., a house) with locally generated power as well as charging a local battery stack and selling excess power to a utility company that provides a grid tie-in. Such control may be automated based on monitoring various control signals or may be manually invoked by a system operator.

20 Claims, 7 Drawing Sheets

(51) Int. Cl.
  *H02J 7/00*   (2006.01)
  *H02J 7/35*   (2006.01)
  *H02M 7/00*  (2006.01)
  *H02J 13/00*  (2006.01)

(56) References Cited

U.S. PATENT DOCUMENTS

| | | |
|---|---|---|
| 2005/0254210 A1 | 11/2005 | Grady et al. |
| 2011/0204720 A1 | 8/2011 | Ruiz et al. |
| 2011/0273130 A1* | 11/2011 | Lee ............... H01M 10/465 320/101 |
| 2012/0126623 A1 | 5/2012 | Koehl |
| 2012/0201016 A1 | 8/2012 | Robertson et al. |
| 2013/0187464 A1* | 7/2013 | Smith ............... H02S 30/20 307/47 |
| 2016/0043555 A1 | 2/2016 | Howell |
| 2016/0173672 A1 | 6/2016 | Boyce |
| 2016/0190812 A1* | 6/2016 | Myer ............ G08G 1/096783 307/21 |
| 2016/0214491 A1* | 7/2016 | Yoko ................. H02J 7/34 |
| 2016/0226252 A1 | 8/2016 | Kravitz et al. |
| 2017/0061095 A1 | 3/2017 | Waskin et al. |
| 2017/0149248 A1* | 5/2017 | Della Sera ............ H02J 3/38 |
| 2017/0229866 A1 | 8/2017 | Ghotra et al. |
| 2017/0265585 A1 | 9/2017 | Della Sera et al. |
| 2017/0346292 A1 | 11/2017 | Handelsman et al. |
| 2018/0054070 A1 | 2/2018 | Krishnamoorthy et al. |

\* cited by examiner

SYSTEM AND METHOD FOR CONTROLLING AND MONITORING SCALABLE MODULAR ELECTRIC DEVICES

PRIORITY CLAIM

This application claims the benefit of U.S. Provisional Application No. 62/394,071, entitled "Modular Inverter System and Charging System for Off-Grid Power Generation," filed Sep. 13, 2016, which is incorporated by reference in its entirety herein for all purposes.

BACKGROUND

Modern society requires a large amount of electrical power generated from a variety of sources. Such power may often be generated on macro levels at facilities such as hydroelectric dams, coal and natural gas-driven generators, and nuclear power plants. As technology improves in other areas, solar-powered generators and wind-powered generators are also becoming a more prevalent source of power generation in society. Generating electrical power has conventionally been accomplished by large enterprises on massive scales, such as utility companies and power companies that produce energy on the order of megawatts and tie directly to a national electrical grid. However, some newer technologies, such as solar and wind, may be well suited to produce energy on micro levels such that individual home owners may own solar- and wind-driven power generators that may supply power to a local house or even produce small amounts of energy to be fed back to the electrical grid.

Thus, a local power sink (e.g., a home), may sometimes draw power from the national electrical grid or from a local micro-generator (or both). Thus, the connection point for the local micro-generator may use a switch controller to facilitate the connections to and from the home and to and from the electrical grid. This may typically involve an inverter/charger because the local micro-generator may produce electrical energy at a voltage that is incongruent with a typical AC voltage of 120/240 volts and 60 Hz. Therefore, local switching circuitry that includes control logic, a proper number and size of inverters/chargers, and a battery for storing electrical energy are all components of a local system needed to properly generate, use and store electrical energy from a local micro-generator.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, the systems and methods discussed herein may be directed to a modular inverter system having a single device enclosure with a plurality of module receptacles capable of receiving one or more modules having tailored functionality. Such modules work in conjunction with each other to handle control of various power sources and power sinks in a mixed-use power generation and consumption system. In various embodiments, these swappable modules include a charge controller module configured to control charging a battery, an inverter/charger module configured to convert an AC voltage to a DC voltage for charging the battery and configured to invert a DC voltage to and AC voltage for supplying AC power, a system controller module configured to control the plurality of inverter/charger modules and the charge controller module and a backplane disposed in the enclosure such that each module receptacle facilitates engaging a respective module with the backplane.

With such a modular inverter system, a novel system controller module may include several electronic switches that may be controlled to couple various nodes in the system controller module to various circuits coupled to input/output terminals at the modular inverter system to realize various modes of operation. Such modes of operation may include powering a local load (e.g., a house) with locally generated power as well as charging a local battery stack and selling excess power to a utility company that provides a grid tie-in. Such control may be automated based on monitoring various control signals or may be manually invoked by a system operator.

The modular inverter system, as described, provides several advantages over conventional non-modular solutions. First, as a local power requirement grows, one can easily add additional functionality to the modular inverter system by simply inserting an additional module. For example, as the AC draw from a battery may grow because a home has added new circuits, one may add an additional inverter/charger module to supply inverted AC power from a local battery stack. Second, a modular inverter system allows for swapping and maintenance while the system remains under load. That is, the modules in the modular inverter system are hot-swappable. Third, the modular inverter system provides a simple and manageable solution for an inverter-grid tie-in such that local power generation system (e.g., wind, solar, and the like) may be continuously in use even if a battery stack is fully charged. That is, the local power that is generated may be sold back to the power company. These and other advantages will become more apparent with the discussion below in conjunction with FIGS. 1-8.

Figure 1:
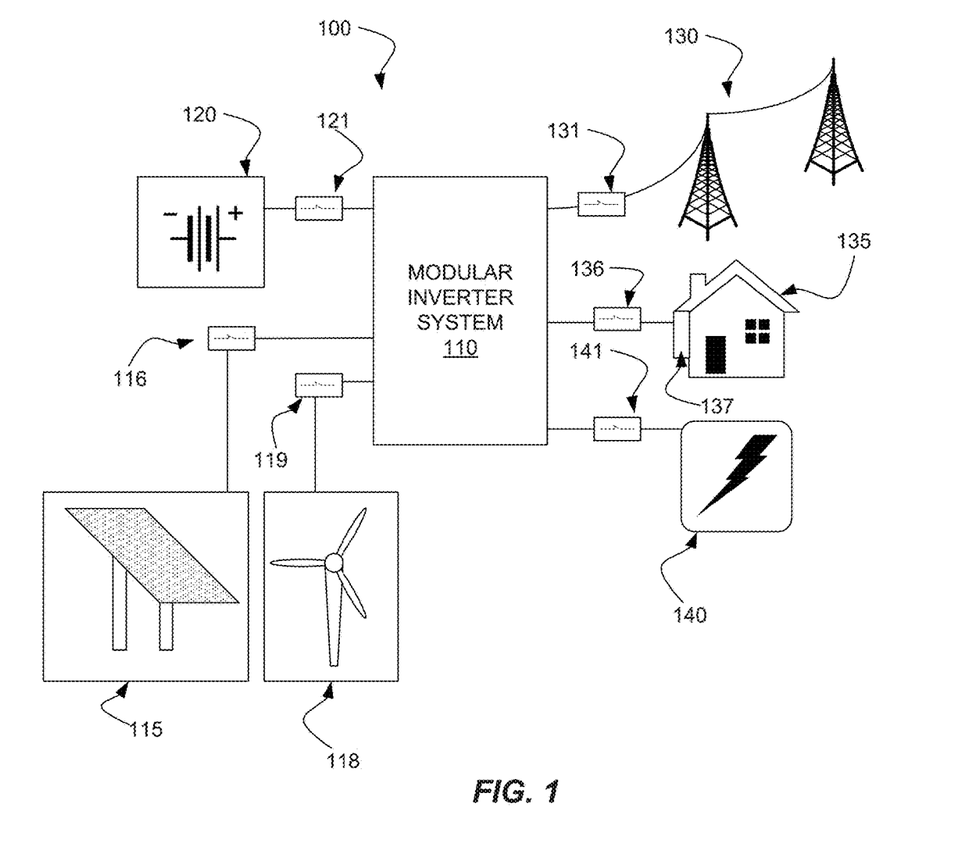
FIG. 1 is a block diagram of an electrical system at a micro level that includes a modular inverter system according to an embodiment of the subject matter disclosed herein.

FIG. 1 is a block diagram of an electrical system 100 at a micro level that includes a modular inverter system 110 according to an embodiment of the subject matter disclosed herein. The electrical system 100 may typically be a power sink (e.g., a home, a building, and the like) with various capabilities for receiving electrical power from an electrical grid 130 or for generating local electrical power from one or more power generation sources. In this example, the power sink is a residential home 135 having a local electrical distribution panel 137 that may include a typical array of electrical devices that consumer power, such as electric heaters, lights, kitchen appliances and the like. Of course, the power sink may be any other facility, building, complex, or standalone device that uses electrical power for operation. As is common, one source for electrical power for the home 135 is the national electrical grid 130 or simply grid 130, hereinafter. In the United States, the national electrical grid comprises a power source with a nearly constant voltage of 120/240 VAC with a nearly constant frequency of 60 Hz. Industrial and commercial scenarios may further involve 3-phase connections at 208 VAC. In other countries, the grid may vary to include voltages up to 240 V and frequencies down to 50 Hz. For this example, the grid will comprise a nearly constant voltage of 120/240 VAC with a nearly constant frequency of 60 Hz.

The grid 130 may be coupled to the home through the modular inverter system 110 in this example. Further, these electrical connections may include respective circuit breakers/disconnect switches (switch 131 associated with the grid 130 and switch 136 associated with the home 135) that may be part of the modular inverter system 110 and controlled by the modular inverter system 110. Each of the switches shown in FIG. 1 may be circuit breakers and may also be part of the modular inverter system 110 to comply with NEC rules and code for providing circuit protection for each of the various electrical connections throughout the system of FIG. 1. As such, these switches, throughout this disclosure may be referred to as disconnect switches or circuit breakers without limitation on underlying function. The specific parameters of control are discussed further below. For now, attention is turned to alternative sources for electrical power associated with the system 100 of FIG. 1.

A first local power source (other than the grid 130) may be an electrical generator 140 coupled to the modular inverter system 110 though an associated disconnect switch 141. The electrical generator 140 may be a gasoline-fired generator, a natural gas-fired generator, a propane-fired generator or any other generator that can generate electrical power at a nearly constant voltage of 120/240 VAC with a nearly constant frequency of 60 Hz. Such a local electrical generator 140 may be used at the home 135 to supply electrical power in lieu of the electrical grid 130 in grid power outages. Since the electrical generator 140 generates electrical power with the same parameters as the grid 130, the modular inverter system 110 simply provides the capabilities of a transfer switch. Such a transfer switch is discussed further below with respect to FIG. 2, but for now, it is sufficient to understand that the transfer switch prevents the grid 130 and the generator 140 from being simultaneously coupled to the home 135 (via mutually exclusive control of switches 141 and 131).

Aside from the power sources that supply power at a nearly constant voltage of 120/240 VAC with a nearly constant frequency of 60 Hz (generator 140 and grid 130), additional local power sources may be used in conjunction with a local battery array 120. A first example of a local power source may be a solar panel array 115 configured to convert solar energy into electrical energy. This converted electrical energy may be used to provide charge to the battery array 120 and may be isolated from the battery array via disconnect switch 116. A typical solar array 115 will generate electrical power at approximately 600 VDC with individual panels generating about 10-20 VDC each. Similarly, a second example of a local power source may be a wind turbine 118 configured to convert wind energy into electrical energy. Other local power sources contemplated but not shown include fuel cells and hydro-electric generators that may include commercial applications up to 1000 VDC. This converted electrical energy may be used to provide charge to the battery array 120 and may be isolated from the battery array via disconnect switch 119. A typical wind turbine will generate electrical power at approximately 600 VDC.

As these local power sources (solar panel 115 and wind turbine 118) typically do not generate power at that which is typically used at a home 135 (a nearly constant voltage of 120/240 VAC with a nearly constant frequency of 60 Hz), the battery array 120 may be used to store electrical charge generated from the local VDC sources. Further, any battery array 120 will only provide a direct current (DC) voltage (typically 48 VDC) and most power sinks require alternating current (AC) voltage (Typically 120/240 VAC). Thus, the modular inverter system 110 may be used to invert DC voltage from the battery array 120 into AC voltage for use at the home 135. Therefore, the battery array may be electrically isolated at times from the modular inverter system 110 via disconnect switch 121.

Each of the disconnect switches in FIG. 1 (116, 119, 121, 131, 136, and 141) may be housed within and controlled by the modular inverter system 110 at various times according to what power source may be providing electrical power to the home 135. The modular inverter system 110 therefore performs several functions in a singular interconnected control system. These functions may include modules for providing one or more automatic transfers between power sources, one or more inverters, one or more battery chargers, one or more charge controllers, one or more electrical panels, electrical surge protection, and electrical circuit breaker protection. Further, each of these functions may be provided with dedicated modules that may be swapped in and out (during operation—referred to as "hot swapping") of a system housing having common backplanes (e.g., a 120/240 VAC backplane and a 48 VDC backplane). Therefore, the overall inverter system 110 is modular, configurable and flexible to meet the needs to almost any configuration of equipment. These modules and associated features are discussed next with respect to FIG. 2.

Figure 2:
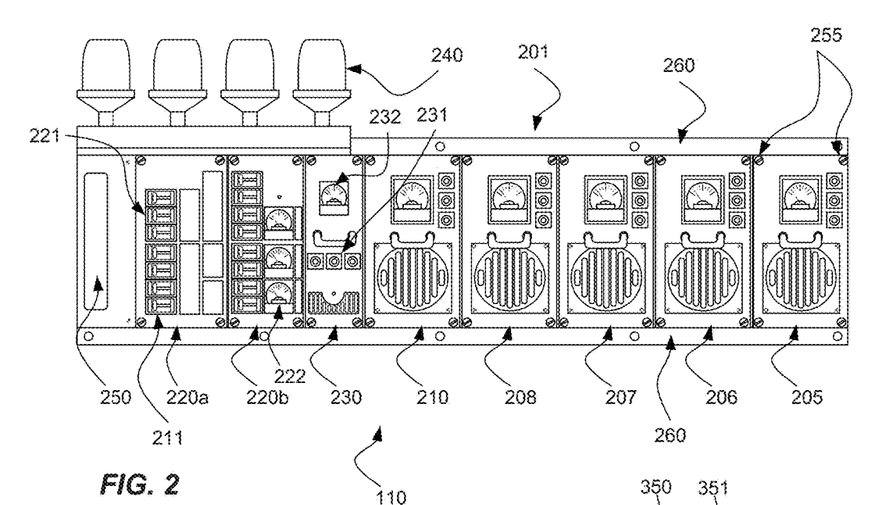
FIG. 2 is a diagram of the modular inverter system of FIG. 1 according to an embodiment of the subject matter disclosed herein.

FIG. 2 is a diagram of the modular inverter system of FIG. 1 according to an embodiment of the subject matter disclosed herein. As discussed above with respect to FIG. 1, the modular inverter system 100 includes several modules for facilitating various interconnection between power sources and power sinks. Such interconnections are managed in a manner that will convert power signals from any power source to a suitable power condition (e.g., electrical power at a nearly constant voltage of 120/240 VAC with a nearly constant frequency of 60 Hz) for use at the power sink—in the case of FIG. 1, a residential home 135. Several different modules are shown in FIG. 2, but a skilled artisan understands that the configuration shown in FIG. 2 is but one example. In the example of FIG. 2, the modules include an electrical panel module 210, a set of four inverter/charger modules 205-208, a charge controller module 210, a system controller module 230, and an electrical interconnection panel module 220A/B. The modular inverter system 110 may further include one or more handles 250. Each of these modules may be configured to be inserted into a rack-style housing 201, wherein at least some of these modules may be pulled out or inserted while other modules remain functional and in use. Prior to discussing the inter-related functionality of the modules within the modular inverter system 110, each of the modules is described next with respect to individual underlying functionality.

The first module to be discussed is one of the set of four inverter/charger modules 205-208; for the sake of selecting one module for exemplary discussion, inverter/charger module 205 will be used. The inverter/charger module 205 comprises two portions: an inverter portion and a charger portion. The inverter portion, sometimes called a power inverter, is an electronic device having circuitry that changes direct current (DC) to alternating current (AC). The input voltage, output voltage and frequency, and overall power handling depend on the design of the specific device or circuitry. Thus, one function of the inverter portion is to convert a 48 VDC signal from a battery array (120 of FIG. 1) to a 120/240 VAC signal at 60 Hz for use at a power sink, such as a residential home (135 of FIG. 1). Inverters are often rated in terms of power (e.g., watts) that the circuitry can handle. In one embodiment, each modular inverter 205 can handle approximately 2 kW or power, however, other sizes are possible and each inverter in the set of five inverter/charger modules need not be matched. Further, not all five spaces need be filled with an inverter/charger module.

The second portion of the inverter/charger module 205 comprises a battery charger portion. A battery charger, or simply charger, is a device used to inject energy into one or more cells of a rechargeable battery by coupling an electric current from a power source (e.g., the battery 120, the grid 130, the generator 140 and the like as shown in FIG. 1). The charging procedure depends on the size and type of the battery being charged. Some battery types have high tolerance for overcharging and can be recharged by connection to a constant voltage source or a constant current source. Once charged (determined via common battery charge level monitoring), the charger may be disconnected from the battery at the end of the charge cycle, or may have a timer to cut off charging current at a fixed time.

Thus, the inverter/charger module 205 may function as an inverter when the power source for supplying power to the home 135 is the battery 120 (e.g., off-grid and not on generator power). In such a mode, the modular inverter system 110 may also invoke the charger portion of each inverter/charger module 205-209 to continue providing a charge signal from an off-grid power source (e.g., the solar panel 115 or wind turbine 118). In a reciprocal manner, the inverter/charger module 205 may function as a charger when the power source for supplying power to the home 135 is the grid 130 or the generator 140 such that power is drawn from the grid 130 or generator 140 to charge the battery 120.

When one or more inverter/charger modules 205-208 are used to provide charge to the battery 120, each respective inverter/charger module 205-208 may be also used in a specific manner to monitor and facilitate a more efficient transfer of electrical energy from one of the various AC power sources to the battery array 120. As such, when used in charger mode, the inverter/charger modules 205-208 may be used to limit the rate at which electric current is fed to or drawn from the battery array 120. The inverter/charger modules 205-208 may be further controlled by the system controller module 230 such that overcharging may be prevented to protect against overvoltage, which can reduce battery 120 performance or lifespan, and may pose a safety risk. In conjunction with the system controller module 230, the inverter/charger modules 205-208 may also prevent completely draining ("deep discharging") the battery array 120, or perform controlled discharges, depending on the battery technology, to protect battery life. Upper and lower limits of battery voltage may be set by the system controller module 230 for the purposes of engaging the charging function of the inverter/charger modules.

When drawing power for charging the battery array 120 from a DC source, a charge controller, (sometimes called a charge regulator or battery regulator) may be used to limit the rate at which electric current is fed to or drawn from the battery array 120. The charge controller module 210 may also be further controlled by the system controller module 230 such that overcharging may be prevented to protect against overvoltage, which can reduce battery 120 performance or lifespan, and may pose a safety risk. In conjunction with the system controller module 230, the charge controller module 210 may also prevent completely draining ("deep discharging") the battery array 120, or perform controlled discharges, depending on the battery technology, to protect battery life. Upper and lower limits of battery voltage may be set by the system controller module 230 for the purposes of engaging the charge controller module 210.

If the charge controller 210 is to be used to facilitate efficient charging of the battery array 120 from power derived from an off-grid DC power source (e.g., the solar panel 115 or the wind turbine 118), the charge controller module 210 may be used to maximize the efficiency of power transfer. This may be accomplished with a charge controller module 210 that includes a Maximum Power Point Tracking (MPPT) feature such that the voltage generated from the off-grid power source may be tracked to determine an optimal current to be used to charge the battery array 120. MPPT is a technique used commonly with wind turbines and photovoltaic (PV) solar systems to maximize power extraction under all conditions. A problem addressed by MPPT is that the efficiency of power transfer from the solar cell or wind turbine depends on both the amount of sunlight falling on the solar panels or wind speed and the electrical characteristics of the load. As the amount of sunlight or wind varies, the load characteristic that gives the highest power transfer efficiency changes, so that the efficiency of the system is optimized when the load characteristic changes to keep the power transfer at highest efficiency. This load characteristic is called the maximum power point and MPPT is the process of finding this point and keeping the load characteristic there. Electrical circuits can be designed to present arbitrary loads to the photovoltaic cells and then convert the voltage, current, or frequency to suit other devices or systems, and MPPT solves the problem of choosing the best load to be presented to the cells to get the most usable power out.

Embodiments of the charge controller module 210 may include inputs for 200 VDC or 600 VDC. The 200 VDC embodiment is capable of handling 120-160 amps making such charge controller modules 210 among the largest in the market. The 600 VDC embodiment is capable of handling 100 amps making such charge controller modules 210 the largest in the present-day market. Further, in the modular inverter system 110 can be configured to have a mix of charge controller modules 210 including different versions (e.g., a 200 VDC version next to a 600 VDC version) such that different sets of solar panels and/or wind turbines may be accommodated.

The charge controller module 210 may also include indicator lights 231 showing the state of the charge controller (e.g., currently charging battery at a first indicator light, currently discharging the battery at a second indicator light, and battery disconnected at a third indicator light). Further, the charge controller 210 may include a current meter 232 showing current flow to or from the battery and may be set manually to monitor specific currents.

The modular inverter system 110 may also include an electrical panel 220A/B that may be coupled to various loads or power sinks via circuit breakers/disconnects. The electrical panel 220A/B provides circuit breakers 211 for each circuit load to be fed. In FIG. 1, the electrical panel 220A/B is shown as a first module ("A") and a second module ("B") though these modules need not be separate and can be one single large module ("A/B"). These circuit breakers may correspond to the disconnect switches 116, 119, 121, 131, 136, and 141 depicted in FIG. 1. The circuit breakers may typically range in size from 15 amps to 200 amps and may be configured to directly receive circuit wires through a rear-panel harness (not shown). The electrical panel 220A/B may include spaces for additional circuit breakers that have yet to be installed. The entire electrical panel module 220A/B itself is modular in that the electrical panel module 220A/B may be inserted and removed from the housing such that the module interfaces with a backplane voltage bar (not shown in FIG. 2).

The electrical panel module 220A/B may include an AC bypass switch 221 that is configured to couple one or more AC inputs directly to one or more AC output nodes and to decouple the AC bus that is part of the backplane of the modular inverter system 110. In this manner, one can bypass the modular inverter system 110 for the purposes of maintenance and troubleshooting without risk of electric shock from components coupled to the AC bus. The electrical panel module 220A/B may feature the circuit breaker/disconnect switches (e.g., 116, 119, 121, 131, 136, and 141 of FIG. 1), in reachable positions such that an operator may manually connect or disconnect any switch at any time. However, the modular inverter system 110 may provide hardware-based or software-based safety provisions that do not allow certain circuit breakers/disconnect switches to be simultaneously connected. Further, the electrical panel module 220A/B may include several meters 222 for monitoring current flow to and from various power sources and power sinks.

The modular inverter system 110 may also include one or more surge protection devices 240. A surge protection device (sometimes called, surge protector, surge suppressor, surge diverter, or lightning arrestor) is an appliance or device designed to protect electrical devices from voltage spikes. The surge protection device 240 attempts to limit the voltage supplied to an electric device by either blocking or shorting to ground any unwanted voltages above a safe threshold. Lastly, the modular inverter system 110 may also include a simple handle module 250 for handling the overall housing. This handle module 250 may be replaced with several other more useful electrical-based modules.

Figure 4:
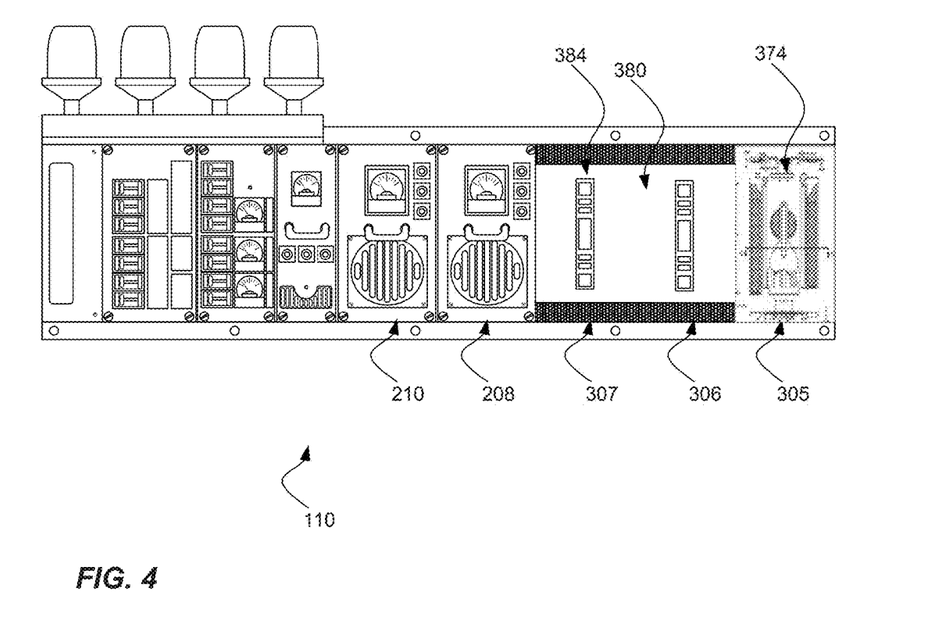
FIG. 4 is a diagram of the modular inverter system of FIG. 2 having some inverter/charger modules removed according to an embodiment of the subject matter disclosed herein.

The modular inverter system 110 when equipped with the modules as shown provides several advantages when used within the system 100 of FIG. 1. One advantage is that the modular inverter system 110 is, in fact, modular. This allows any of the modules to be hot swapped while any power source remains engaged and providing power to any connected load. In this embodiment, there are five "power" module spaces shown that are currently filled with inverter/charger modules 205-208. In other embodiments, there may be only three power modules (differentiated from module spaces reserved for control features, such as modules 210, 220A/B, and 230). In still further embodiments, there may more than five modules or a second housing (not shown) with additional power module spaces electrically coupled to a first housing 201. Further yet, not all power module spaces need be filled (as is shown in FIG. 4 and discussed below).

The modules may be easily swapped in and out using simple securing mechanisms such as thumbscrews 255. Such thumbscrews typically do not require any tool to operate and actuate. Further, the housing may include wing brackets 260 for mounting to a wall using conventional screws or other fasteners. The weight of the modular inverter system 110 is small enough to not require triangle bracing or other form of support from below. Additional features of the modular inverter system 110 are discussed further below in the context of FIGS. 3-5.

Figure 3:
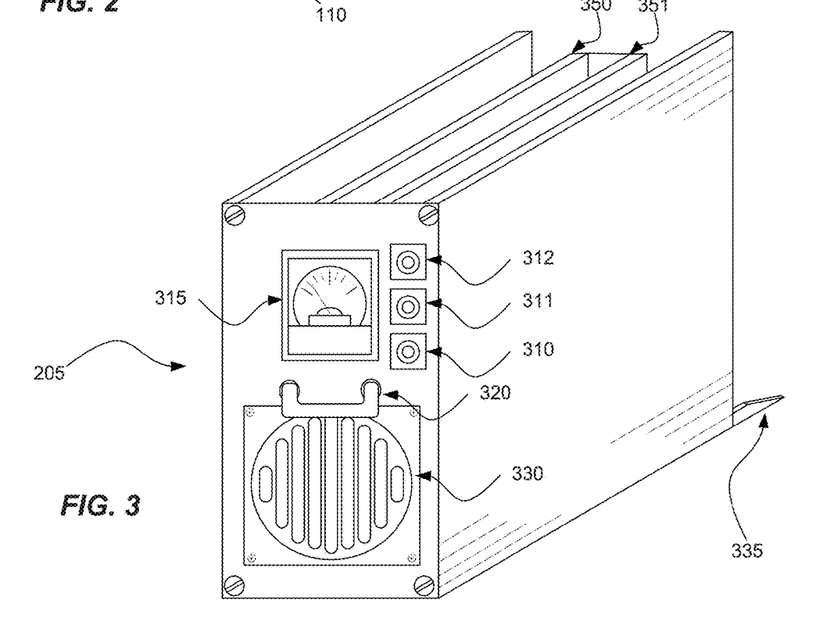
FIG. 3 is a diagram of one inverter/charger module of FIG. 2 according to an embodiment of the subject matter disclosed herein.

FIG. 3 is a diagram of one inverter/charger module 205 of FIG. 2 according to an embodiment of the subject matter disclosed herein. The inverter/charger module 205 is shown disengaged from any modular inverter system 110 so that additional features may be seen. Specifically, two different internal protrusions 350 and 351 are shown. These protrusions 350 and 351 may be printed circuit boards (PCB) having electronic components configured to couple the inverter/charger module 205 to one or more internal busses in a modular inverter system 110 via a peripheral interface that may be part of backplane. Thus, a first PCB protrusion 350 may be a circuit configured to engage a 48 VDC bus such that the inverter/charge module may draw power from the battery (120 of FIG. 1—also coupled to the 48 VDC bus) to be inverted into a voltage signal at nearly 120/240 VAC and nearly 60 Hz. The inverted 120/240 VAC signal is routed to the second PCB protrusion 351 to be coupled to a second bus that is for 120/240 VAC and coupled to the home 135 and/or grid 130. Thus, when the inverter/charger module 205 is being used as an inverter, a 48 VDC signal is drawn from the battery and inverted to a 120/240 VAC signal for use at the load.

Likewise, the second PCB protrusion 351 may be a circuit configured to engage a 120/240 VAC bus such that the inverter/charge module 205 may draw power from the grid (130 of FIG. 1—also coupled to the 120/240 VAC bus) to be converted into a voltage signal at nearly 48 VDC. The converted 48 VDC signal is routed to the first PCB protrusion 350 to be coupled to a first bus that is for 48 VDC and coupled to the battery 120. Thus, when the inverter/charger module 205 is being used as a charger, a 120/240 VAC signal is drawn from the grid 130 (or generator 140) and converted to a 48 VDC signal for charging the battery 120.

Additional PCBs (not shown) may also be present in some embodiments for facilitating electrical couplings and communications between the PCBs 350 and 351. Further, in some embodiments, the outside walls (shown in FIG. 3, but not called out by reference number) may not be present such that only the PCB protrusions 350 and 351 extend back beyond the front faceplate of the inverter/charger module 205.

In an embodiment, inverter/charger module 205 is rated to provide approximately 2000 watts of continuous power inverted from a coupled battery 120 wherein the battery 120 is coupled to a 48 VDC nominal input. When used as a charger, the inverter/charger module 205 includes circuitry to provide power factor correction depending on the current charge state of the coupled battery 120. Each inverter/charger module includes indicator lights and/or selection buttons for various states of operation. In one embodiment, these indicator lights and/or selection buttons include engaged meter selection button 310 (e.g., selection for meter to monitor AC or DC bus), AC voltage present light 311 and a DC voltage present light 312 indicative of what a local meter may be measuring. Further, the inverter/charger module 205 includes a meter 315 for current flow (either to the battery 120 when charging or to the home 135 when inverting). In other embodiments not shown, these indicator lights and/or selection buttons include inverter engaged 310 (e.g., power on), input voltage present 311 and a scale light 312 indicative of what a local meter is measuring. Further yet, inverter/charger module 205 includes a fan port 330 for providing an airflow path through the inverter/charger module 205 for cooling the inverter/charger module 205.

In this embodiment, the inverter/charger module 205 is hot swappable. Thus, an operator may use a front-panel mounted handle 320 to pull the inverter/charger module from the housing (assuming the thumb screws have been disengaged). This pulling motion will disengage peripheral interface connectors on each PCB board 350 and 351 and may result in a transient current arc (e.g., current spike). Such transients may cause voltage fluctuations. However, each PCB board 350 and 351 provides a current path such that all voltage above 30 VAC or 30 VDC are dissipated within 0.5 seconds after backplane connectors disengage from any peripheral interface. That is, each PCB board 350 and 351 includes a spark arrestor circuit configured to arrest a transient current generated from the removal of the power module. Further, each inverter/charge module 205 includes on-board fuses for AC input/output and for DC input. Thus, a defective module 205 blows local fuses rather than taking down the entire modular inverter system 110 by blowing a battery breaker.

Each inverter/charger module 205 may be controlled by a system controller module 230 to be in one of two modes of operation. A first mode of operation may be an inverting mode whereby the inverter/charger module 205 functions as an inverter. In such an inverter mode of operation, current from the DC bus may be drawn by the inverter/charger module 205 (e.g., a magnitude of DC-sourced current) and inverted into an AC signal to be placed on the AC bus. Ultimately, power derived from this DC-sourced current may be used to provide AC power to the power sink (e.g., the residence 130 or any load). In an opposite manner, a second mode of operation may be a charging mode whereby the inverter/charger module 205 functions as a charger. In such a charger mode of operation, current from the AC bus may be drawn by the inverter/charger module 205 (e.g., a magnitude of AC-sourced current) and converted into an DC signal to be placed on the DC bus. Ultimately, power derived from this AC-sourced current may be used to provide DC power to the battery for charging the battery 120.

In one embodiment, when more than one inverter/charger module 205 is installed in a modular inverter system 110, the system controller module 230 may be configured to control each inverter charger module 205-208 collectively as a bank of inverter/charger modules 205-208. Thus, each inverter/charger module 205-208 is in the same mode of operation as the others (e.g., either inverting or converting/charging). In another embodiment, however, when more than one inverter/charger module 205 is installed in a modular inverter system 110, the system controller module 230 may be configured to control each inverter charger module 205-208 individually as discrete inverter/charger modules 205-208. Thus, each inverter/charger module 205-208 may be set to be one mode or the other (e.g., either inverting or converting/charging). In this manner, one inverter/charger module 205 may be drawing power from the DC bus and converting for use as a load or for selling back to the grid 130, while a different inverter/charger module 206 may be inverting power from the AC bus for providing a charge signal to the battery 120.

FIG. 4 is a diagram of the modular inverter system 110 of FIG. 1 having some inverter/charger modules removed according to an embodiment of the subject matter disclosed herein. The modular inverter system 110 shown in FIG. 4 is similar to the modular inverter system 110 of FIG. 2 except that three particular inverter/charger modules 205, 206, and 207 are removed to show empty spaces 305, 306, and 307. The empty spaces show inside the housing 201 such that peripheral interfaces to the backplane 380 can be illustrated. As can be seen, a typical module bay (e.g., module receptacle) may include a peripheral interface 384 such that protruding connectors of various modules may "stab" into the open peripheral interfaces. Other manners of interfacing swappable modules with a backplane 380 are contemplated but not shown for brevity.

The backplane 380 may itself be a printed circuit board having electrical traces for control signals. The backplane 380 may include a first side (the side that can be seen in the empty spaces 306 and 307) that has several peripheral interfaces for engaging various modules, such as an inverter/charger module 205. The backplane 380 includes a second side that is opposite the first side with the peripheral interfaces. This second side cannot be seen in FIG. 4, but includes two backplane busses. The first backplane bus is a 48 VDC backplane bus and the second backplane bus shown is a 120/240 VAC backplane bus. Any inverter/charger module (e.g., inverter/charger module 208 in FIG. 4) and the charge controller module 210 may engage these backplane busses with respective stab-in connectors that may be part of respective PCB protrusions 350 and 351 as shown in FIG. 3. Further, additional modules, such as system controller module 230 and electronic panel module 220a/220b may also engage the backplane 380 through respective peripheral interfaces (not shown). When some modules are removed (e.g., during a hot swap or if such modules are not needed), one can see that the peripheral interfaces to such busses are exposed. Such exposure may be dangerous to operators who may touch said backplane busses accidentally.

To prevent accidental shock hazard and to comply with electrical code and electrical standards (e.g., UL listing and the like), each empty space may include a movable safety door 374. In FIG. 4, one safety door 374 is shown at space 305 (space 306 and 307 do not shown any safety door to illustrate backplane bus bars 350 and 351. Safety door 374 may be spring-mounted such that as a module is pulled from housing, the safety door 374 swings down into place. Further, the safety door 374 may include a locking mechanism (not shown in detail) preventing the safety door 374 from swinging back open when any force is applied to the front of the door 374. The locking mechanism may be released when a safety door engagement protrusion 335 of any module (such as the module 205 depicted in FIG. 3). The safety door 374 may also be opened using a tool (also not shown) designed to disengage the locking mechanism. Providing a closed and locked safety door 374 improves air flow across the backplane bus bars when no module is installed. In other embodiments, air restrictors (e.g., empty modules) may be installed in module bays that are empty so cooling air is not channeled into an empty module bay. In this manner, unique airflow routes for providing cooling air above and below installed modules to get to each module bay is maintained.

The busses may be monitored by the system controller module 230 for voltage level and current flow. Further, each inverter/charger module may also monitor each bus for voltage level and current flow. In this manner, the system controller module 230 may then engage of disengage various module functionality as is needed. Thus, the system controller module 230 may be a master controller over other module functionality and embodies logically-based decision circuitry to determine if electric power is to be stored at the battery via a charging procedure or sold back to the grid using an electric grid tie-in procedure. The system controller module 230 may control the flow of electric current on the backplane busses via a set of electronic switches (shown in FIG. 5 and described below) that may be actuated to couple various circuits to one or both busses.

Figure 5:
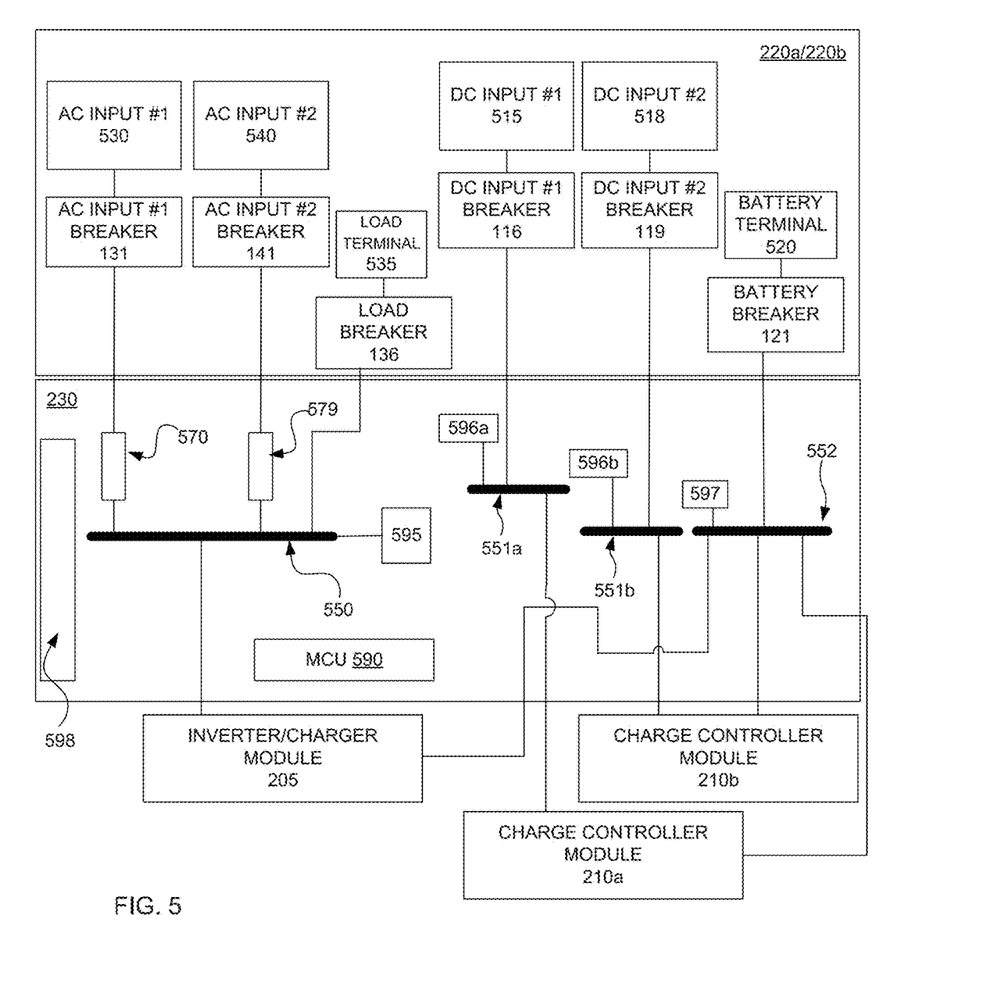
FIG. 5 is a block diagram of various components of the modular inverter system of FIG. 2 illustrating the control functionality of the system controller module according to an embodiment of the subject matter disclosed herein.

FIG. 5 is a block diagram of various components of the modular inverter system of FIG. 2 illustrating the control functionality of the system controller module 230 according to an embodiment of the subject matter disclosed herein. Specific aspects of some of the modules are shown in greater detail in this figure. The modules shown in FIG. 5 includes a set of electronic panel modules 220a/220b, a system controller module 230, charge controller modules 210a/210b and an inverter/charger module 205. The following discussion of electrical circuits, nodes, and control components are depicted in FIG. 5 as being part of various modules, but a skilled artisan understands that various functionality may be realized in various electrical circuits at any location regardless of delineations between various modules. The delineation of these modules is but one embodiment and any connection to any component may include an input/output node at the delineation between modules without affecting the operation of the system as a whole. Further, any of the various connections between modules, nodes, and busses may include controllable switches for connecting and disconnecting the various couplings.

Turning to the specific details of the embodiment of FIG. 5, the electronic panels 220a/220b are shown with several input and output nodes as well as circuit breakers to protect the circuits coupled to the various input and output nodes and to provide a means for circuit disconnection. In particular, the embodiment of FIG. 5 includes a first AC input node 530 coupled to a first AC input circuit breaker 131. Such a first AC input node 530 may be coupled to an electric grid, such as the electrical grid 130 of FIG. 1—thus the circuit breaker 131 as also depicted in FIG. 1. Similarly, the embodiment of FIG. 5 includes a second AC input node 540 coupled to a second AC input circuit breaker 141. Such a second AC input node 540 may be coupled to a local electric AC generator, such as the generator 140 of FIG. 1—thus the circuit breaker 141 as also depicted in FIG. 1.

Further, the embodiment of FIG. 5 includes a first DC input node 515 coupled to a first DC input circuit breaker 116. Such a first DC input node 515 may be coupled to a first local DC energy generator, such as the solar panel 115 of FIG. 1—thus the circuit breaker 116 as also depicted in FIG. 1. Sometimes, the first DC input node 515 may be called a PV (photovoltaic) input node. Similarly, the embodiment of FIG. 5 includes a second DC input node 518 coupled to a second DC input circuit breaker 119. Such a second DC input node 518 may be coupled to a second local DC energy generator, such as the wind turbine 118 of FIG. 1—thus the circuit breaker 119 as also depicted in FIG. 1. In various other embodiments not shown, the system may include more than two DC inputs as shown or fewer than two.

Further yet, the embodiment of FIG. 5 includes a load terminal 535 (e.g., an AC output node) coupled to a load terminal circuit breaker 136. Such a load terminal node 535 may be coupled to a load, such as the residence 135 of FIG. 1—thus the circuit breaker 136 as also depicted in FIG. 1. Sometimes, the load terminal node 535 may be called the AC bus. Similarly, the embodiment of FIG. 5 includes a battery terminal node 520 coupled to a battery terminal circuit breaker 121. Such a battery terminal node 520 may be coupled to a DC voltage source, such as the battery 120 of FIG. 1—thus the circuit breaker 121 as also depicted in FIG. 1.

Each of the respective identified circuit breakers as discussed above may be coupled to a respective electronic switch or relay (or in some embodiments, more than one switch or no switch) that may be disposed in the system controller module 230. Each switch in the system controller module 230 may be a solid-state switch comprised of electronic components such as one or more transistors. Other electro-mechanical switches are also possible, but may be more cumbersome given that the system controller module 230 may be a printed circuit board or an integrated circuit chip. The system controller module 230 uses the various switches to couple the various input nodes to busses and to couple the busses to various output nodes and other inverter system modules utilizing various logical processes and programmed procedures. Further, the illustration of FIG. 5 shows an AC bus 550, input DC busses 551a/551b, and a battery DC bus 552, though a skilled artisan understands that the depicted busses 550, 551a/551b and 552 may be physically located outside of the system controller module 230 and the depiction of said busses 550, 551a/551b and 552 may simply be representative of nodes that may be coupled to such external busses.

Specific switches in the system controller module 230 include a switch 570 configured to couple the first AC input circuit 530 to the AC bus 550 (though the first input circuit breaker 131) as well as a switch 579 to couple the second AC input circuit 540 to the AC bus 550 (through the second input circuit breaker 141). Further, additional switches may be used to couple various nodes to various other inverter system modules. Specifically, the system controller module 230 also include: a switch (not shown) configured to couple the charge controller module 210 to the second DC bus 552, a switch (not shown) configured to couple an inverter/charger module 205 to a first DC input bus 551a, a switch (not shown) configured to couple an inverter/charger module 205 to a second DC input bus 551b, and a switch (not shown) configured to couple the charge controller module 210 to the battery DC bus 552.

These switches may all be controlled by an on-board master control unit (MCU) 590 (although individual control connections are not shown for clarity). The overall system controller module 230 may be a printed circuit board (PCB) with various connectors clustered in a peripheral 598 that is designed to interface with a peripheral interface of the backplane as shown in FIG. 4. Further, the MCU 590 may receive additional input and output signals suited to provide feedback for various control and operation scenarios. All the various inputs and outputs are discussed below with respect to FIG. 6, but two are specifically shown in FIG. 5: a voltage sensor 595 to detect a voltage level of the AC bus node 550, a voltage sensor 596 to detect a voltage of the first DC bus node 551 and a voltage sensor 597 to detect a voltage of the second DC bus node 552.

The system controller module 230 may be programmed or configured to facilitate various modes of operation. The modes of operation are not mutually exclusive as more than one mode may be undertaken simultaneously. Certain safeguards and restrictions will prevent some of the modes of operation from be carried out at the same time. These modes, which are discussed in greater detail below, include: AC grid power to load, local AC power to load, AC grid power to charge battery, local AC power to charge battery, DC power to charge battery, DC power to load, DC power to grid tie-in, and local AC power to grid tie-in. Through control of various switches, these modes may be invoked either via manual control or though automatic control when various feedback signals trigger an automated operation.

A first mode of operation may be a mode to provide power to a load 535 from an electric AC grid 530. This is a common situation for any load wherein an electric grid may be sourced to provide power. Thus, the switch 570 may be closed to couple the electric grid circuit 530 to the AC bus node 550. Further, the AC bus node is coupled to the load circuit 535. In this manner, AC current may flow from the electric grid circuit 530 through the AC bus node 550 and to the load circuit 535.

A second mode of operation may be a mode to provide power to a load 535 from a local AC source 540. This is a common situation for any load wherein an off-grid local generator may be sourced to provide power. Thus, the switch 579 may be closed to couple the local AC generator circuit 540 to the AC bus node 550. In this manner, AC current may flow from the local AC generator circuit 530 through the AC bus node 550 and to the load circuit 535.

A third mode of operation may be a mode to provide charging power to a battery from an electric AC grid. Such a mode of operation may be used to maintain a constant charge at a local battery stack. Thus, the switch 570 may be closed to couple the electric grid circuit 530 to the AC bus node 550. Further, the AC bus node 550 is coupled to the inverter/charger module 205 (being used here as a charger) to convert the AC voltage on the AC bus node 550 to a DC signal. Then, the inverter/charger module 205 is coupled to the DC battery bus node 552. In this manner, power sourced from the electric grid circuit 530 may be converted through the inverter/charger module 205 to provide charge to the battery circuit 520.

A fourth mode of operation may be a mode to provide charging power to a battery from a local AC source. Such a mode of operation may also be used to maintain a constant charge at a local battery stack. Thus, the local AC generator circuit 540 is coupled to the AC bus node 550 through closed switch 579. Further, the AC bus node 550 is coupled to the inverter/charger module 205 (being used here as a charger) to convert the AC voltage on the AC bus node 550 to a DC signal. Then, the inverter/charger module 205 is coupled to the DC battery bus node 552. In this manner, power sourced from the electric grid circuit 530 may be converted through the inverter/charger module 205 to provide charge to the battery circuit 520.

A fifth mode of operation may be a mode to provide charging power to a battery from a local DC source. Such a mode of operation may be invoked to once again maintain charge at a local battery stack when a local power source is available. Thus, the local DC power source circuit 515 may be coupled to the first DC input bus node 551a through a first DC input breaker 116. Then, the charge controller module 210a is coupled to the first DC bus node 551a for pulling DC power form the first DC bus 551a to charge the battery DC bus 552. In this manner, power sourced from a local DC source is drawn to provide charge to the battery circuit 520. The charge controller module 210a is to be used to more efficiently transfer charge to the battery circuit 520 because the first DC bus 551a may be nominally operating at a much higher voltage (e.g., 600 VDC) that the second DC bus 552 (e.g., 48 VDC).

A mode of operation similar to the fifth mode of operation may be a mode to provide charging power to a battery from a different local DC source. Such a mode of operation may be invoked to once again maintain charge at a local battery stack when a local power source is available. Thus, the local DC power source circuit 518 may be coupled to the second DC input bus node 551b through a second DC input breaker 119. Then, the charge controller module 210b is coupled to the first DC bus node 551b for pulling DC power form the first DC bus 551b to charge the battery DC bus 552. In this manner, power sourced from a local DC source is drawn to provide charge to the battery circuit 520. The charge controller module 210b is to be used to more efficiently transfer charge to the battery circuit 520 because the first DC bus 551b may be nominally operating at a much higher voltage (e.g., 200 VDC) that the second DC bus 552 (e.g., 48 VDC).

A sixth mode of operation may be a mode to provide DC-sourced power to the load. Such a mode of operation may be used for off-grid scenarios that involve DC-power generators and a local battery stack. Thus, the battery DC bus node 552 will be used to provide power to the load terminal 535 through one or more inverter/charger modules 205. The battery DC bus node 552 is coupled to the inverter/charger module 205 (being used here as an inverter) to convert the DC voltage on the second DC bus node 552 to an AC signal. Then, the inverter/charger module 205 is coupled to the AC bus node 550 and if the load breaker 136 is closed, then AC power is delivered to the load terminal 535.

A seventh mode of operation may be a mode to sell power back to an electric AC grid from a local DC source. In this mode, a system may have sufficient local power (for example, from a photovoltaic array) to sustain the load and therefore has excess power available to sell back to a utility company through a grid tie-in. Thus, the switch configuration of the sixth mode above (DC-sourced power to load) may be invoked. Additionally, switch 570 may be closed to allow excess AC current to flow back to the electric grid circuit 530.

An eighth mode of operation may be a mode to sell power back to an electric AC grid from a local AC source. In this mode, a system may again have sufficient local power (for example, from a local gas-powered AC generator) to sustain the load and therefore has excess power available to sell back to a utility company through a grid tie-in. Thus, the local AC generator circuit 540 is coupled to the AC bus node 550 through the second AC input breaker 141 and closed switch 579. Additionally, switch 570 may be closed to allow excess AC current to flow back to the electric grid circuit 530. A similar ninth mode of operation allows for the local AC source to provide power without selling back power to the utility through a grid tie-in (e.g., switch 570 remains open).

Through various control signal monitoring, the system control module 230 may automatically trigger various modes based on sensed control signal levels. For example, in a home 135 equipped with a generator 140 and the modular inverter system 110, when an electric grid 130 outage occurs, the system controller module 230 may initiate a startup sequence at the generator 140. Once the system controller module 230 senses that the generator voltage is sufficiently high enough to provide proper electric power, the system controller module 230 disconnects the electrical grid 130 (via switch 570) and engages the generator 140 (coupled directly to the AC bus node 550). The generator 140 supplies power to the home 135, but is not connected to the electrical grid 130. Further, the battery 120 may be charged from power drawn from the now connected generator 140. It is necessary to isolate the generator 140 from the distribution system to protect the generator 140 from overload in powering loads in the home 135 and for safety, as utility workers expect the electric grid 130 lines to be dead.

As another example, the voltage level of the battery DC bus node 552 may be monitored such that if the voltage level falls below a threshold voltage, one or more battery charging modes are triggered. Further, the system controller module 230 may monitor voltages at local generator (AC or DC) circuits and invoke various modes to utilize the voltages being generated locally. Some modes may be invoked simultaneously using more than one external module (external to the system controller module 230). As but one example, one may charge the battery and provide power to the load from a local DC source by inverting local DC power for the load (via a first inverter/charger module being used as an inverter) and converting voltage from the AC bus node 550 (via a second inverter/charger module being used as a charger) to charge the battery. Various control signals that may be used by the system controller module 230 are discussed next with respect to FIG. 6.

Figure 6:
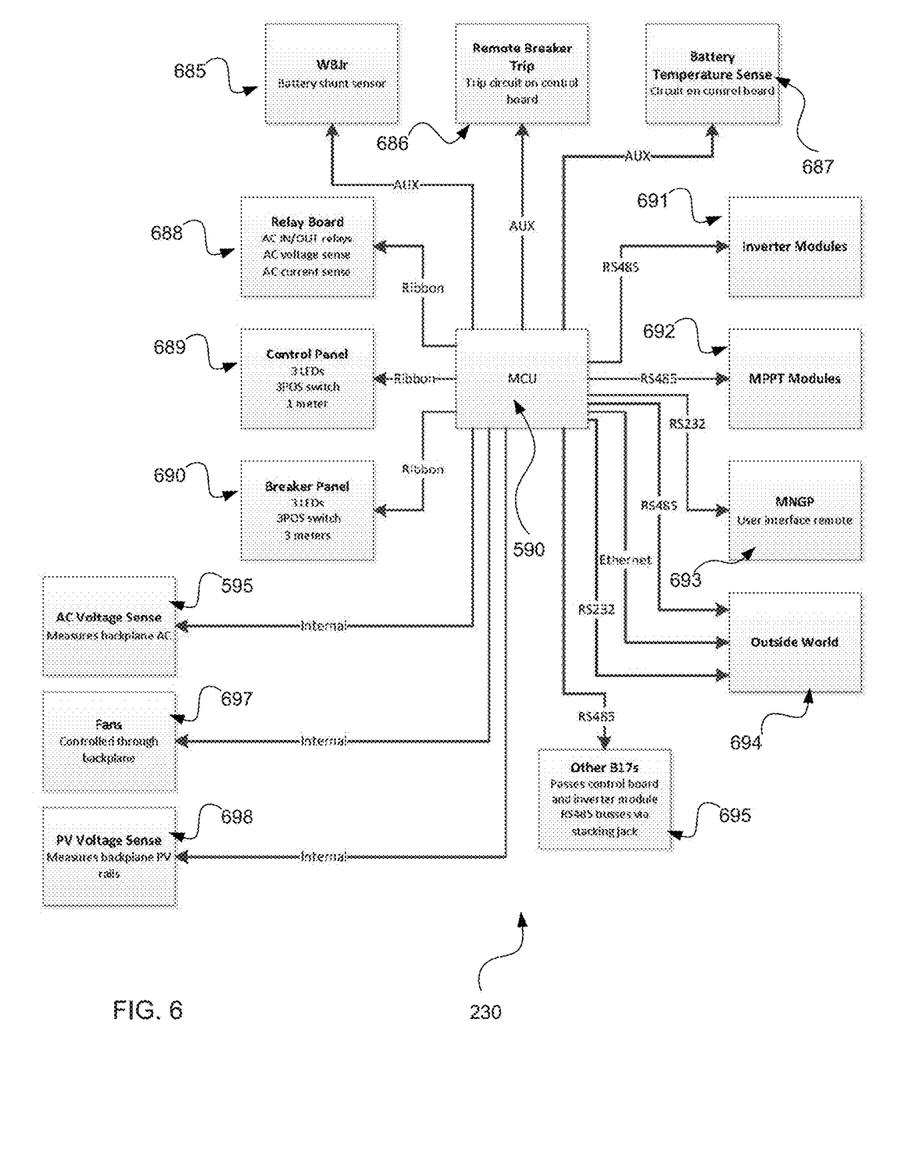
FIG. 6 is a block diagram of various components of the system controller module of FIG. 2 illustrating the communication functionality of the system controller module according to an embodiment of the subject matter disclosed herein.

FIG. 6 is a block diagram of various components of the system controller module of FIG. 2 illustrating the communication functionality of the system controller module 230 according to an embodiment of the subject matter disclosed herein. FIG. 6 is organized from a block perspective of several different aspects of an overall modular inverter system 110. Each of the "blocks" represents one or more control signals by which the MCU 590 may utilize to invoke control functionality. Starting from the top of FIG. 6, the system control module 230 may monitor a battery voltage level sensor 685 and a battery temperature sensor 687. Further, a remote breaker trip signal for the battery terminal may also be monitored. These three signals may be grouped together via a three-signal auxiliary cable that is run to the location of the local battery stack.

Other control signals may be internal to the system control module 230. For example, the AC bus node may be monitored via an AC voltage sensor 595. Further, the local system fans 697 may be controlled and monitored. Further yet, various power inputs may be monitored for voltage level, such as the photovoltaic input node voltage sensor 698. Still other signals may all be grouped together in a ribbon cable the couples the system controller module 230 with other local control panels and electrical panels (such as electrical panel 220a/220b of FIG. 2). For example, various switches may be located on a separate PCB and controlled via a switch board control block 688. A human interface control panel 689 may include a group of control signals and a local breaker panel 690 may include another group of control signals.

The MCU 590 may also communicate with various modules and components external to the system controller module 230. Thus, various inverter modules may be part of an inverter module control block 691 that utilizes an RS-485 communication protocol. Similarly, various charge controller modules may be part of a charge controller module control block 692 (sometimes called MPPT modules) that also utilizes an RS-485 communication protocol. A remote user panel block 693 may be communicatively coupled to the MCU 590 via an RS-232 communication protocol. Other modular inverter systems 695 may be communicatively coupled to the MCU 590 via an RS-485 communication protocol. And, a catch-all "outside world" control block 694 may invoke communication and control functionality with other non-system devices, such as the internet, logging modules, broadcast devices, and the like. These various other devices may be communicatively coupled to the MCU 590 through one or more of an Ethernet connection, an RS-232 connection and an RS-485 connection.

Figure 7:
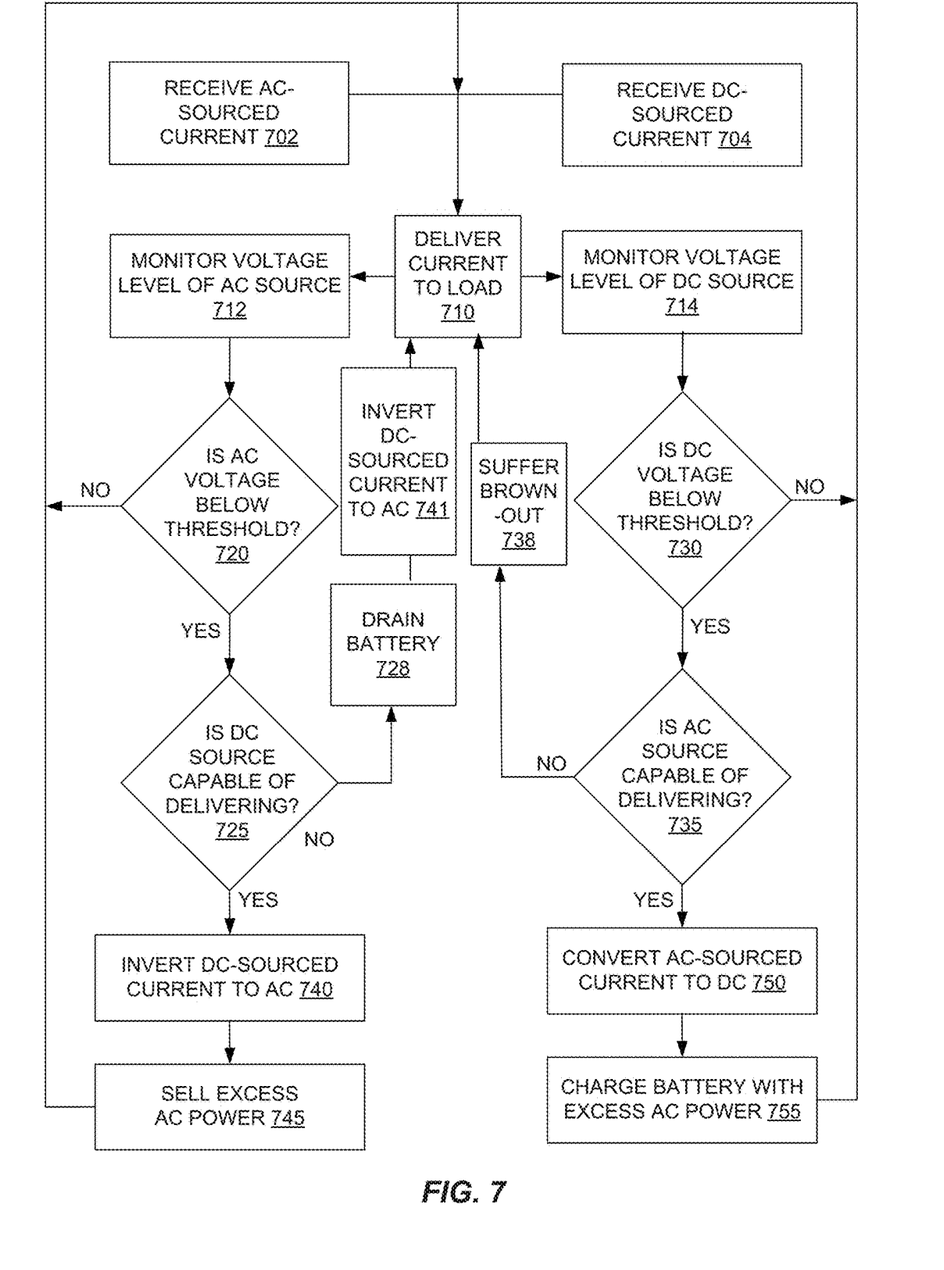
FIG. 7 is a flow chart of a method for handling inversion and conversion of various power signals within the modular inverter system of FIG. 1 according to an embodiment of the subject matter disclosed herein.

FIG. 7 is a flow chart of a method for handling inversion and conversion of various power signals within the modular inverter system of FIG. 1 according to an embodiment of the subject matter disclosed herein. In an embodiment of the method illustrated in FIG. 7, two branches (roughly equating to the lefts side steps and the right-side steps as depicted in FIG. 7) may be executed simultaneously and without regard to the steps of the other branch. Each branch eventually culminates with delivering current to the load (e.g., delivering power to the home). Each branch may begin with respective step of receiving current from a specific source to the AC bus.

At step 702 (left-side branch), current source from an AC source may be delivered to the AC bus. Such AC-sourced current may then be used to provide current (e.g., power) to the load at step 710. Further, as current is delivered to the load at step 710, the voltage level of the AC bus may be monitored at step 712 with respect to a threshold (e.g., approximately 120/240 VAC at approximately 60 Hz). Similarly, and possibly simultaneously, at step 704 (right-side branch), current sourced from a DC source may delivered to the AC bus. Such DC-sourced current may then be used to also provide current (e.g., power) to the load at step 710. Further, as current is delivered to the load at step 710, the voltage level of the DC bus may be monitored at step 714 with respect to a threshold (e.g., approximately 48 VDC).

Continuing with the left-side branch, a query step 720 determines if the voltage level on the AC bus has fallen below the threshold. Such a scenario may occur during a power outage on the grid or during a battery drain when a load is being powered by the battery. If the voltage level on the AC bus is maintained, then the method loops back to step 710 where current continues to be delivered to the load and the voltage level on the bus continues to be monitored at step 712. If the voltage level drops below the threshold, a second query step 725 determines whether the battery has sufficient charge to deliver enough current to the load despite the below-threshold voltage level on the AC bus (e.g., supplement the AC bus with DC-sourced power to maintain voltage at threshold level). If, at query step 725, the battery has enough charge to provide the deficient current to the load, then the DC-sourced current is inverted at step 740 and any excess AC current (e.g., current the exceeds what is needed by the load) may be sunk to a connected grid at step 745. That is, excess power may be sold to a utility company through a grid tie-in. If, at query step 725, the battery does not have enough charge to provide the deficient current to the load, then the battery may still be used to provide current (via an inverter/charger module) until the battery becomes drained. Thus, the battery will begin to drain at step 728 while the DC current that is available is inverted at step 741 and placed on the AC bus to be provided to the load at step 710.

Continuing with the right-side branch, a query step 730 determines if the voltage level on the DC battery bus has fallen below the threshold. Such a scenario may occur during a battery drain when a load is being powered by the battery. If the voltage level on the DC battery bus is maintained, then the method loops back to step 710 where current continues to be delivered to the load and the voltage level on the DC battery bus continues to be monitored at step 714. If the voltage level drops below the threshold, a second query step 735 determines whether any connected AC-source (e.g., grid, local generator, and the like) is sufficient power to deliver enough current to the load (e.g., supplement the AC bus with AC-sourced power to maintain voltage at threshold level). If, at query step 735, the AC-bus has enough power to provide the deficient current to the load, then the AC-sourced current is converted at step 750 and the resultant DC current may be used to begin charging the battery at step 755. If, at query step 735, the AC-bus does not have enough power to provide the deficient current to the load, then the battery will drain to zero and the load may experience a brown-out or black-out at step 538.

Various methods using the various steps of FIG. 7 may be realized. One such method includes receiving a first magnitude of AC-sourced current at an inverter/charger from an AC bus (step 702) and receiving a second magnitude of DC-sourced current at the inverter/charger from a DC bus (step 704). Then, the method may include delivering a third magnitude of current to a load coupled to the AC bus (step 710). Given the dual originating sources of possible current to supply power to the load, the method may determine if the third magnitude of current being delivered to the load is less than the second magnitude of DC-sourced current (steps 730 and 735) and then, in response, converting a portion of the first magnitude of AC-sourced current into DC current to charge a DC source (steps 750 and 755). That is, if the sum of the first magnitude of AC-sourced current and the second magnitude of DC-sourced current exceeds the third magnitude of current being delivered to the load. Similarly, the method may determine if the third magnitude of current being delivered to the load is greater than the second magnitude DC-sourced current (steps 720 and 725), and then, in response, inverting the DC-sourced current into an AC current (steps 740) and selling power to a utility associated with an AC source if the sum of the first magnitude of AC-sourced current and the second magnitude of DC-sourced current exceeds the third magnitude of current being delivered to the load (step 745).

Figure 8:
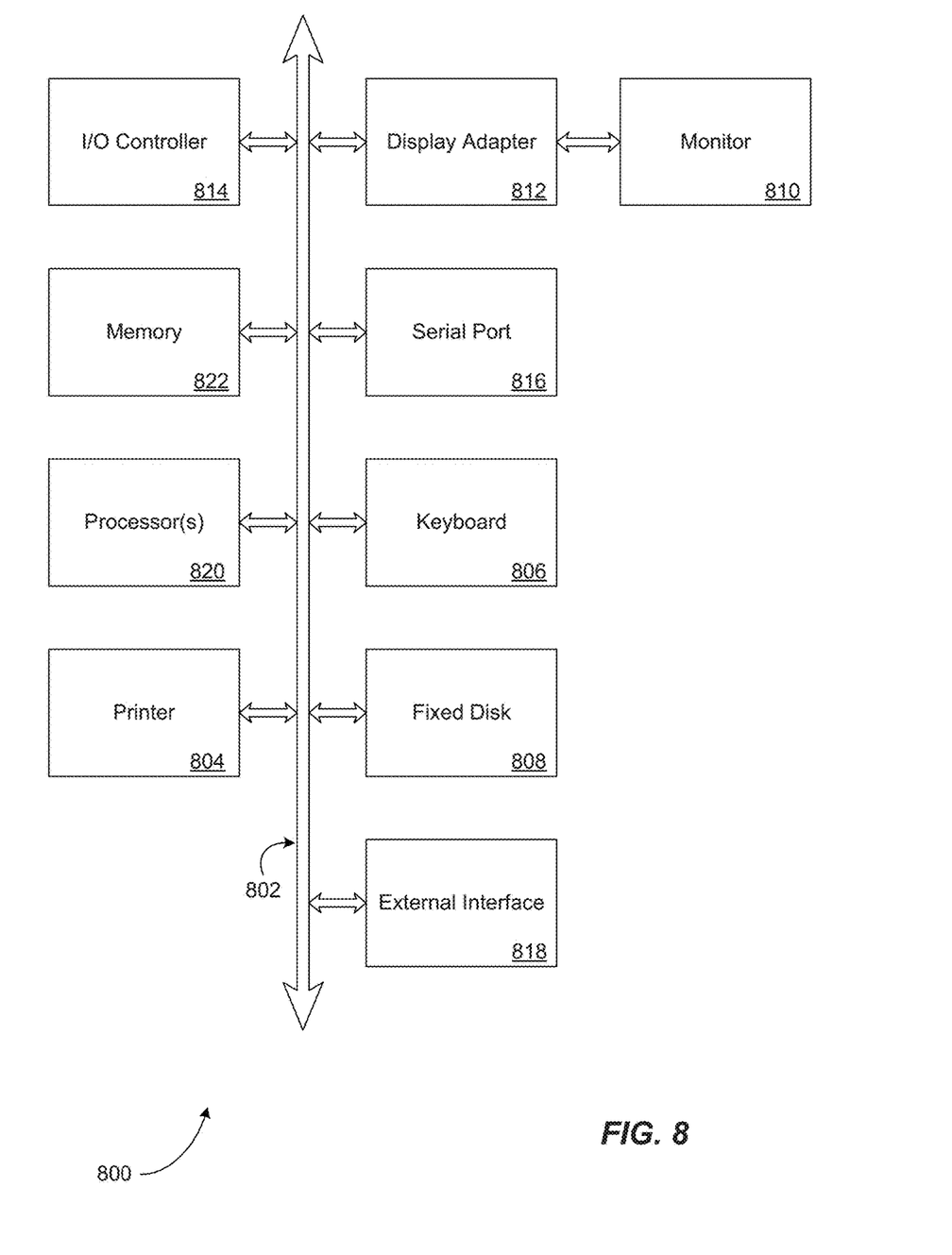
FIG. 8 is a diagram illustrating elements or components that may be present in a computer device or system configured to implement a method, process, function, or operation in accordance with an embodiment.

FIG. 8 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a master control unit (MCU), central processing unit (CPU), or microprocessor. Such processors may be incorporated in an apparatus, server, client or other computing or data processing device operated by, or in communication with, other components of the system. As an example, FIG. 8 is a diagram illustrating elements or components that may be present in a computer device or system 800 configured to implement a method, process, function, or operation in accordance with an embodiment. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Assembly language Java, JavaScript, C, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. An electrical controller, comprising:
   an AC bus node;
   a DC bus node;
   an AC input node;
   a DC input node coupled to the DC bus node;
   a battery node;
   a switch configured to couple the AC bus node to the AC input node
   a first inverter/charger node coupled to the AC bus node;
   a second inverter/charger node coupled to the battery node;
   a charge controller input node coupled to the DC bus node; and
   a charge controller output node coupled to the battery node.

2. The electrical controller of claim 1, further comprising an electric load node coupled to the AC bus node.

3. The electrical controller of claim 1, further comprising:
   a second charge controller input node coupled to the DC bus node; and
   a second charge controller output node coupled to the battery node.

4. The electrical controller of claim 1, wherein the switch comprises a solid-state switch including electronic components.

5. The electrical controller of claim 1, further comprising a voltage sensor coupled to the AC bus node and configured to sense a voltage on the AC bus node.

6. The electrical controller of claim 1, further comprising a voltage sensor coupled to the DC bus node and configured to sense a voltage on the DC bus node.

7. The electrical controller of claim 1, further comprising a processor coupled to the switch and configured to control the switch.

8. The electrical controller of claim 1, further comprising a printed circuit board having connectors disposed on an end of the printed circuit board to engage a peripheral interface.

9. The electrical controller of claim 1, further comprising:
   a second DC bus node;
   a second DC input node coupled to the second DC bus node;
   a second charge controller input node coupled to the second DC bus node; and
   a second charge controller output node coupled to the battery node.

10. An electrical system, comprising:
    an electrical controller having:
      an AC bus node;
      a DC bus node;
      an AC input node;
      a DC input node coupled to the DC bus node;
      a battery node;
      a switch configured to couple the AC bus node to the AC input node
      a first inverter/charger node coupled to the AC bus node;
      a second inverter/charger node coupled the battery node;
      a charge controller input node coupled to the DC bus node; and
      a charge controller output node coupled to the battery node;
    a battery configured to provide DC power and coupled to the battery node;
    an electrical connection to an electrical grid configured to provide AC power and coupled to the AC input node;
    a local power generation device configured to provide DC power and coupled to the DC input node; and
    a power sink configured to receive AC power.

11. The electrical system of claim 10, wherein the power sink comprises one of the group comprised of: a residence, a motor, a commercial building, and an electrical grid.

12. The electrical system of claim 10, wherein the battery comprises a DC current source having an approximate constant voltage of 48 VDC.

13. The electrical system of claim 10, wherein the electrical grid comprises a AC current source having an approximate constant voltage of 120/240 VAC and an approximate frequency of 60 Hz.

14. The electrical system of claim 10, wherein the local power generation device comprises one of the group comprised of: a solar panel array, a wind turbine, a fuel cell, and a hydro-electric turbine.

15. A method for manipulating electrical power in a modular inverter system, the method comprising:
    coupling an AC power source to an AC bus;
    converting AC power on the AC bus to DC power and injecting the converted DC power to a first DC bus;
    coupling a DC power source to a second DC bus;
    charging the first DC bus with DC power from the second DC bus; and
    inverting DC power from the first DC bus while the AC power from the AC bus is being converted.

16. The method of claim 15, wherein:
    converting AC power further comprises converting AC power through a first inverter/charger module; and
    inverting the DC power further comprises inverting DC power through a second inverter/charger module.

17. The method of claim 16, further comprising:
    ceasing to invert the DC power through the second inverter/charger module; and converting an additional amount of AC power from the AC power to DC power to the first DC bus through the second inverter/charger module.

18. The method of claim 16, further comprising:

ceasing to convert the AC power through the first inverter/charger module; and inverting an additional amount of DC power from the first DC bus to AC power to the AC bus through the first inverter/charger module.

19. The method of claim 15, further comprising:

coupling the first DC bus to a charge controller module;

coupling the second DC bus to the charge controller module; and drawing DC power from the second DC bus to optimally charge a battery coupled to the first DC bus.

20. The method of claim 15, further comprising:

generating DC power from a local DC source; and injecting the locally generated DC power to the second DC bus.

* * * * *